United States Patent [19]
Anders et al.

[11] Patent Number: 5,818,925
[45] Date of Patent: Oct. 6, 1998

[54] VIEWING ANGLE COMPENSATION OF LCD DISPLAY

[75] Inventors: Susan Cushman Anders, Hamilton County; Scott David Fudge; James Joseph Hartmann, both of Marion County, all of Ind.; Glen Eric Stanley, Monmouth County, N.J.

[73] Assignee: Lucent Technologies Inc., Murray Hill, N.J.

[21] Appl. No.: 775,485

[22] Filed: Dec. 31, 1996

[51] Int. Cl.⁶ .............................. H04M 1/00; G09G 3/36; G09G 5/10
[52] U.S. Cl. .......................... 379/396; 379/435; 379/436; 379/441; 345/87; 345/147
[58] Field of Search ................................ 379/396, 93.17, 379/93.23, 457, 258, 379, 435, 436, 441; 345/63, 87, 89, 147, 126

[56] References Cited

U.S. PATENT DOCUMENTS

| | | | |
|---|---|---|---|
| 5,109,219 | 4/1992 | Kastan et al. | 345/94 |
| 5,187,743 | 2/1993 | Gumb et al. | 379/436 |
| 5,189,404 | 2/1993 | Masimo et al. | 345/126 |
| 5,233,339 | 8/1993 | Newman et al. | 345/784 |
| 5,517,212 | 5/1996 | Inoue | 345/211 |

*Primary Examiner*—Krista Zele
*Assistant Examiner*—Charles N. Appiah

[57] ABSTRACT

The characters of liquid crystal display devices (LCDs) normally exhibit asymmetrical visibility or identifiability dependent upon the direction from which the display is viewed. The asymmetrical identifiability is controllable by the bias applied to the LCD. The contrast of a liquid crystal display device used in a telephone apparatus is automatically controlled by a position sensing switch in accordance with the spatial orientation of the telephone apparatus in order to select the bias that will effectuate the greatest identifiability for the characters of display.

4 Claims, 4 Drawing Sheets

VIEWING ANGLE COMPENSATION OF LCD DISPLAY

TECHNICAL FIELD

This invention relates to telephone apparatus and, more particularly, to telephone apparatus having an LCD display.

BACKGROUND OF THE INVENTION

With the advent of more sophisticated telephone services such as caller identification) an increased need for the visual display of information relevant to the telephone call has arisen. The liquid crystal device commonly referred to by the acronym "LCD easily and conveniently fulfills the function of translating electrical signals into visible information. LCD displays are currently employed to display the number dialed by the telephone user as well as the number of the calling line. Almost from the outset of their introduction into widespread usage, telephones have been available as wall-mountable or table-top instruments. More recent manufacturing techniques have permitted the same basic instrument to be used in either orientation by providing the face plate of the instrument with a base that is adaptable to be wall or desk- top mounted. While the printed or engraved numbers or letters on the dial or key buttons remain visible whether the telephone is used in either the desk top or wall-mounted orientation, the information displayed on the LCD device may not be equally discernable in both positions. This is because the visibility of the information displayed by an LCD device depends on the viewing angle. While the visibility may be adjusted by varying the electrical bias supplied to the LCD this has heretofore required the use of a rheostat or potentiometer. It would be desirable to compensate for the anticipated viewing angle by automatically adjusting the LCD bias for desk top or wall-mounted orientation of the telephone set without requiring the use of an adjustable rheostat device.

SUMMARY OF THE INVENTION

In accordance with the principles of the invention, in one illustrative embodiment thereof, the face plate of a telephone bearing an LCD display can be assembled to its base in either of two positions to accommodate either vertical (wall mounting) or horizontal (desk-top) installation at the user's premises while the bias drive that determines visibility is automatically adjusted to maximize the visibility of the character display. In the preferred embodiment, the orientation of the LCD display is sensed incident to the attachment of the face plate to the base by actuation of a small switch which adjusts the LCD bias to maximize visibility depending on the orientation of the face plate to the base. That is, when the face plate is attached to the base for wall mounting the face plate will cause the switch to be operated to one position and, when the face plate is attached to the base for desk top usage the micro switch will be in another position. The operation of the switch adjusts the bias for the LCD to maximize visibility in either orientation. In an alternative embodiment a mercury switch is mounted to the face plate carrying the LCD display and changes the bias in accordance with the orientation of the face plate.

BRIEF DESCRIPTION OF THE DRAWINGS

The foregoing and other objects and features of the present invention may be more readily appreciated when the ensuing description is read together with the drawing, in which.

GENERAL DESCRIPTION

Figure 1:
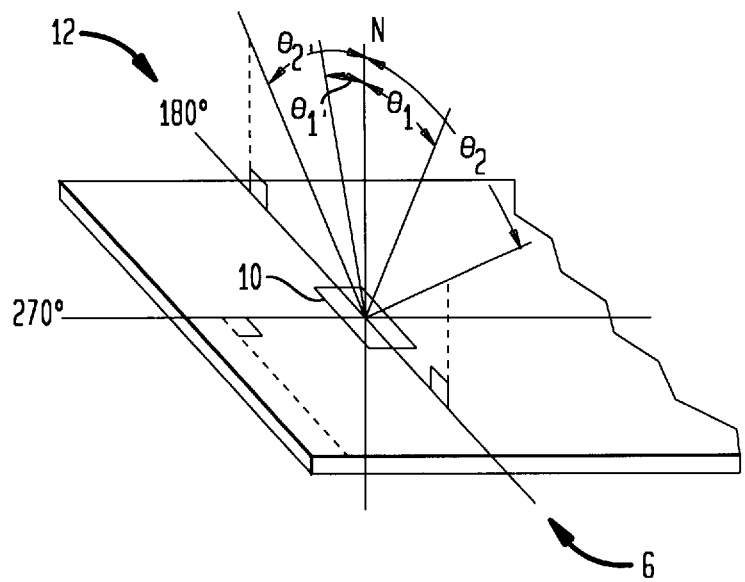
FIG. 1 shows the range of viewing angles in which the characters on an illustrative LCD display can be identified.

Referring now to FIG. 1, a conventional LCD display unit 10 is schematically depicted to show the range of viewing angles over which the characters on LCD display are identifiable. Identifiability can be quantified according to the relative contrast between the LCD characters and the LCD background. In this diagram the line N is drawn normal to the surface of the LCD display while angles $\theta_1$ and $\theta'_2$, measured in opposite directions from the normal line, define the range of viewing angles over which the characters on the LCD will be identifiable when the LCD is viewed from the "12 o'clock" position shown by arrow 12. Similarly, the angles $\theta'_1$ and $\theta'_2$ define the range of viewing angles over which the characters on the LCD display will be identifiable when the LCD is viewed from the "6 o'clock" position shown by arrow 6. Since $\theta_1<\theta_2$ and since $\theta'_1<\theta'_2$ the visibility of the characters will be different when viewed from the different directions 6 and 12. In other words, the characters of the LCD display exhibit asymmetrical visibility characteristics when viewed from opposing directions 6 and 12. Current LCD technology determines that the maximum values of $\theta_1+\theta_2$ for satisfactory visibility are restricted to a range of something less than about 45 degrees, depending on LCD type, with typical values of the less expensive LCDs often being in the range of only degrees. The angular ranges of visibility $\theta_1+\theta_2$ and $\theta'_1+\theta'_2$ are determined by the bias applied to the LCD, value of bias increasing the visibility for viewing from direction 6 and another value bias increasing the visibility of the characters for viewing from direction 12.

Figure 2:
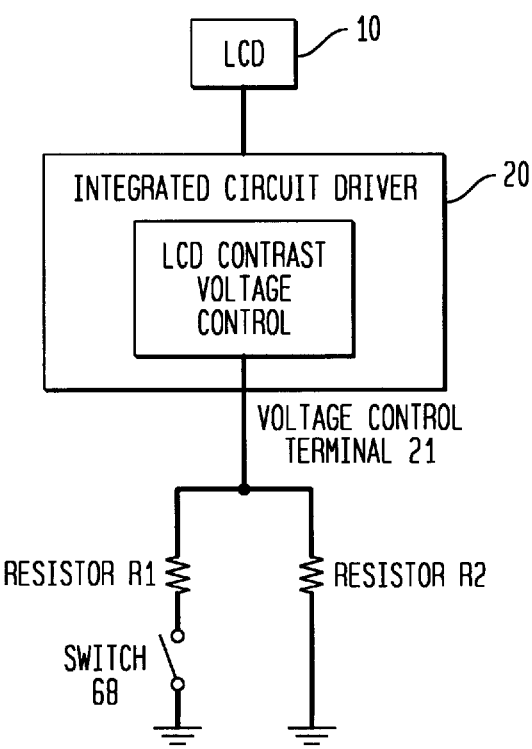
FIG. 2 shows is a schematic diagram showing the adjustment of LCD bias by the orientation sensing switch on the face plate of FIGS. 6 and 7.

In FIG. 2 an arrangement is shown for altering the applied bias. The LCD 10 is supplied with power by an integrated circuit driver 20 which includes an LCD contrast voltage control terminal 21. Two resistors R1 and R2 are connected to voltage control terminal 21. Resistor R2 is returned directly to ground while resistor R1 is returned to ground in series with position switch 68. When switch 68 is closed, it will complete a low resistance path to ground for resistor RI and establish one value of bias potential at terminal 21. When switch 68 is opened it will increase the bias potential at terminal 21. Accordingly, the bias drive supplied by LCD voltage control terminal 21 to the LCD is determined by the operational state of switch 68. In one operational state switch 68 completes the bias drive to render viewing angles $\theta_1+\theta_2$ more visible while in the other state switch 68 alters the bias to render viewing angles $\theta'_1+\theta'_2$ more visible. Switch 68 in the preferred embodiment is a small lever actuated micro switch mounted on the telephone set face plate which is actuated to one of its alternate operational states when contacted by a finger projecting from the telephone set base when the face plate is assembled to the base. Alternatively, switch 68 may be a mercury switch which completes or opens a circuit depending on its orientation in space.

Figure 3:
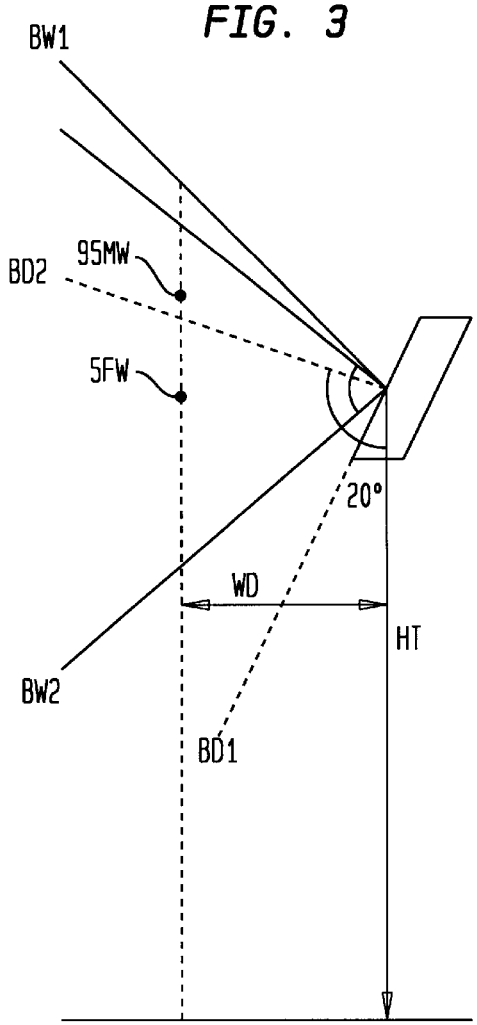
FIG. 3 shows the range of viewing angles for a wall mounted telephone.

FIG. 3 schematically shows how the variation in height of the telephone user population affects the angle from which a wall mounted telephone will be viewed. The typical height HT of a wall mounted telephone set is 5 feet from the floor and the user is assumed to be standing at a working distance WD of 18 inches from the telephone. Point 95MW represents the height of eye for 95% of the adult male population while point 5FW represents the height of eye for the shortest 5% of the age 12 female population. The range of maximum visibility of an LCD display on the telephone should embrace users whose height of eye embraces both points 95MW and 5FW, as is indicated by the solid lines labeled BW1 and BW2.

Figure 4:
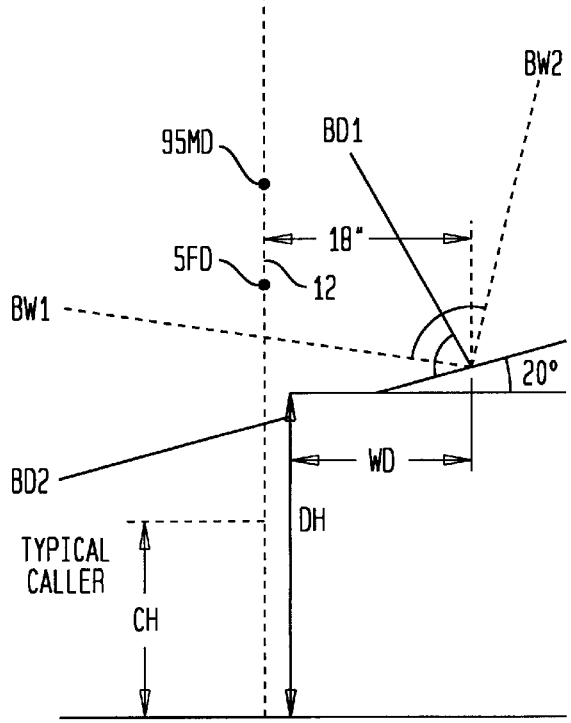
FIG. 4 shows the range of viewing angles for a desk mounted telephone.

FIG. 4 schematically shows how the variation in the seated height of the telephone user population affects the angle from which a desk mounted telephone will be viewed. The typical telephone user will be seated at a desk having a height DH of 30 inches upon a chair having a leg height CH of 18 inches using a telephone at a working distance WD of 18 inches from the desk edge. Point 95MD represents the height of eye for 95% of the adult male population while point 5FD represents the heigh of eye for the shortest 5% of the age 12 female population. The range of maximum visibility of an LCD display on the telephone should embrace users whose height of eye embraces both points 95MD and 5FD, as indicated by the dashed lines BD1 and BD2.

Figure 5:
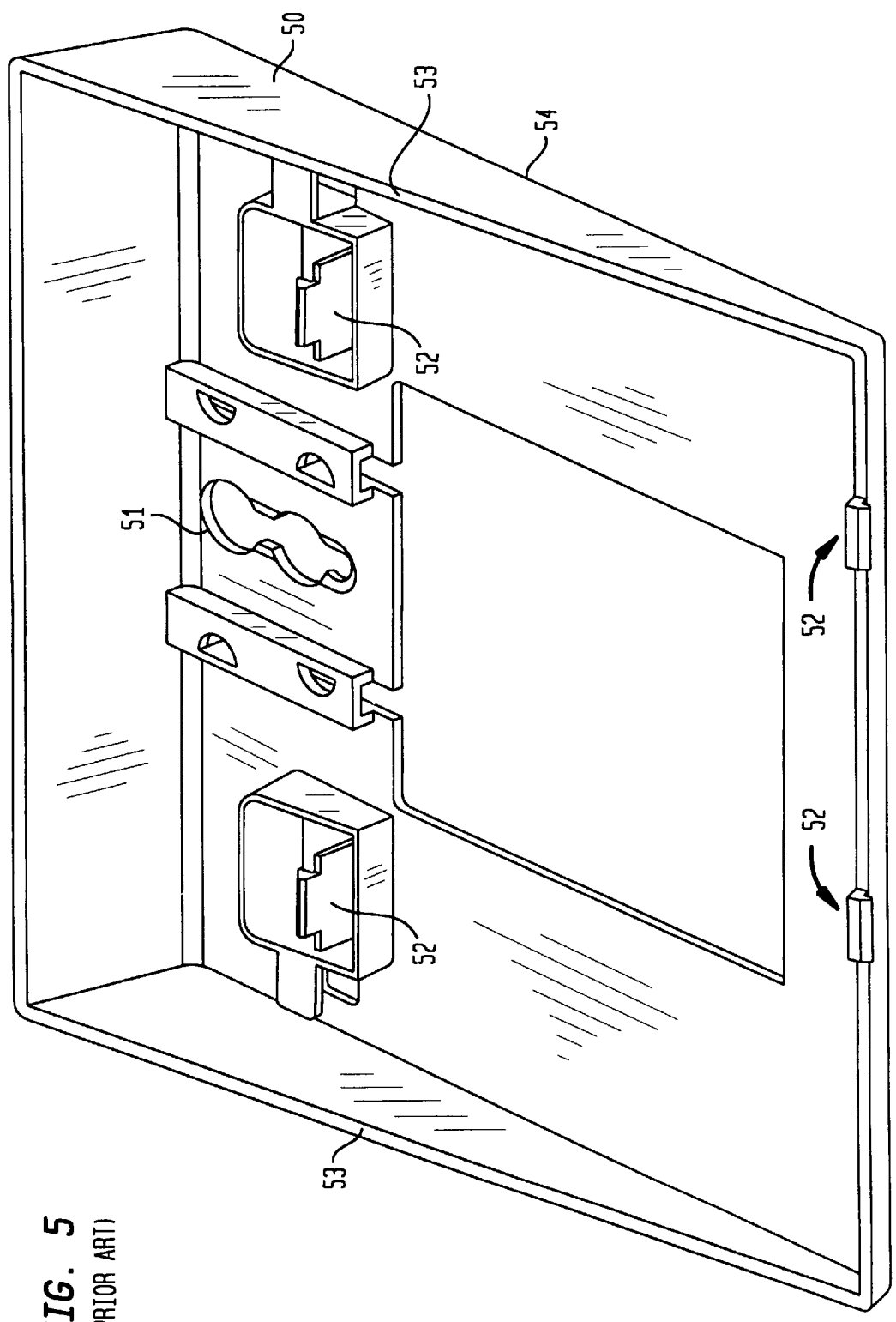
FIG. 5 shows a conventional telephone set reversible base.

FIG. 5 shows a typical prior art reversible base 50 which can accommodate a telephone face plate in either of two orientations for wall or desk mounting. Base 50 is typically made of moldable plastic material. The bottom surface 54 of base 50 has a slotted hole 51 through which a screw (not shown) can be inserted to mount the base to the wall. If the telephone set is to be located on a desk top, slotted hole 51 is not used. In either event, the face plate containing the electrical circuitry of the telephone, is secured to base 50 by means of attachment snaps or fingers 52 which have hook-like projections that catch edges 64 or 65 located on the underside of the face plate, as more clearly shown in FIG. 6 and 7. The rim 53 of base 50 is slanted at an angle of 20 degrees from the bottom 54 of base 50 to improve visibility of the face plate when the telephone is to used on a desk top.

Figure 6:
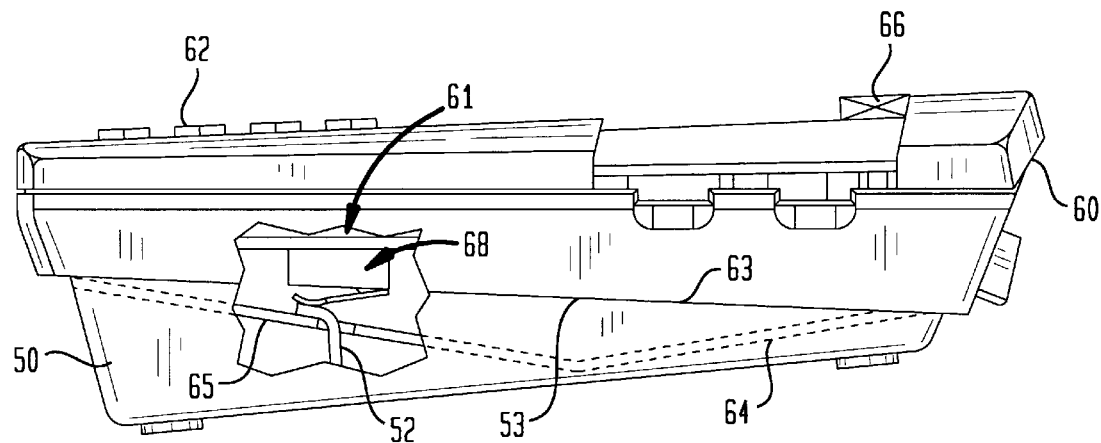
FIG. 6 shows a telephone set face plate having an orientation sensing switch actuated to alter the LCD bias assembled to the base of FIG. 4 for wall mounting.

FIG. 6 shows a partial cutaway of telephone set having a face plate assembly 60 mounted to base 50 in the orientation best adapted for a wall mounting of the telephone. In this orientation finger 52 hook onto an edge 64 on the underside of face plate 60. Face plate 60 contains a circuit board 61 supporting a set of conventional key buttons 62 which project through the upper surface of the face plate so as to accessible for operation by the telephone user. In addition, an LCD display 66 is provided on face plate 60 whose characters may be used to display the called number, the calling number, the time of day, the duration of the call or, indeed, any other useful or desirable information about the telephone call. In the orientation shown in FIG. 6 projecting finger 52 actuates micro switch 68.

Figure 7:
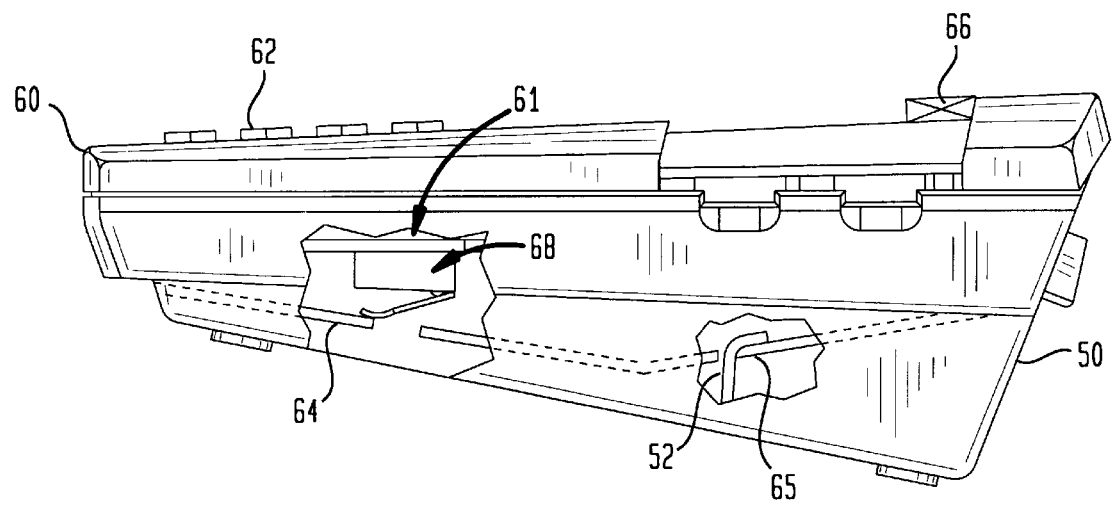
FIG. 7 shows a telephone set face plate assembled to the base of FIG. 4 for desk mounting.

FIG. 7 shows a partial cutaway of the telephone mounted to base 50 in the orientation best adapted for a desk top mounting of the telephone. In this orientation finger 52 hooks onto an edge 65 on the underside of face plate 60. In the orientation shown in FIG. 7 projecting finger 52 fails to actuate micro switch 68.

What has been described is deemed to be illustrative of the principles of our invention. Further and other modifications may be apparent to those skilled in the art such as, for example, replacing lever-actuated micro switch 68 with another form of position or orientation sensing switch such as a mercury switch or a rotary switch with mechanical detents that index to different degrees of rotation making a different pair of contacts at each detent. Such modifications may be made without however departing from the spirit and scope of our invention.

What is claimed is:

1. A telephone apparatus having a reversible base comprising:

a liquid crystal display and a contrast adjustment for the characters of said liquid crystal display, wherein said reversible base is mounted in either a substantially vertical orientation or a substantially horizontal orientation according to whether the telephone apparatus is for wall or desk mounting;

wherein said telephone apparatus further includes means for pivotally reversing said base between said orientations;

a position sensing switch, said switch being operated to one state when said telephone apparatus has said substantially vertical orientation and to its other state when said telephone apparatus has said substantially horizontal orientation, and bias circuitry for said liquid crystal display, said bias circuitry being responsive to the state of said position sensing switch for switching the bias to make said characters more visible in one rather than the other of said orientations.

2. A telephone apparatus according to claim 1 wherein said position sensing switch is a micro switch.

3. A telephone apparatus according to claim 2 wherein said base of said telephone apparatus includes a projection for actuating said micro switch when said base is in one orientation and for allowing said micro switch to be non-actuated when said base is in the opposite orientation.

4. A telephone apparatus according to claim 3 wherein the position of said position sensing switch compensates for the different viewing angles from which taller or shorter telephone users would view said characters of said display when said base is mounted in either orientation.

* * * * *